G. W. ROBERTS.
WINDMILL GEARING.
APPLICATION FILED AUG. 23, 1911.
1,012,916.
Patented Dec. 26, 1911.
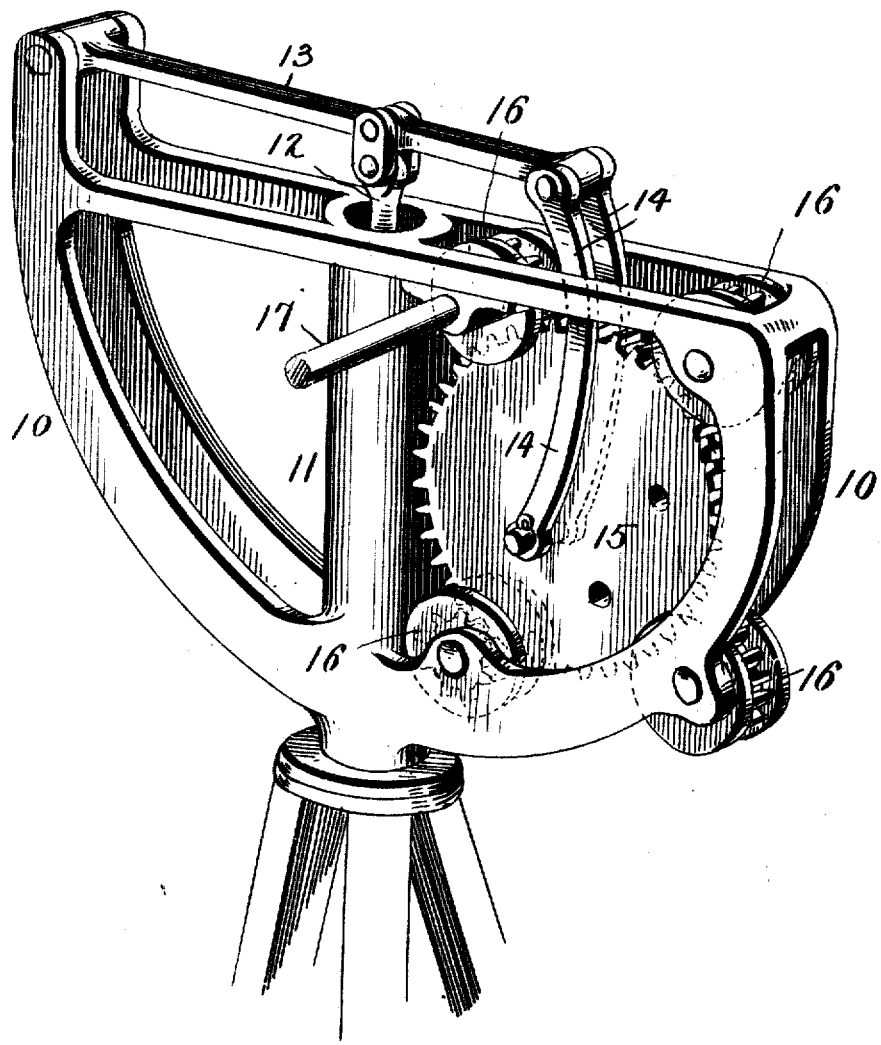

UNITED STATES PATENT OFFICE.

GEORGE W. ROBERTS, OF MENARDVILLE, TEXAS.

WINDMILL-GEARING.

1,012,916.   Specification of Letters Patent.   Patented Dec. 26, 1911.

Application filed August 23, 1911. Serial No. 645,516.

*To all whom it may concern:*

Be it known that I, GEORGE W. ROBERTS, of Menardville, in the county of Menard and in the State of Texas, have invented a certain new and useful Improvement in Windmill-Gearing, and do hereby declare that the following is a full, clear, and exact description thereof.

The object of my invention is to provide gearing for transmitting motion from the wind wheel to the pump rod which will not be subject to oblique strains, and besides this important advantage which results in a balanced condition of the parts and the saving of wear, and the fuller utilization of the power developed, I am able to produce a very simple mechanism.

My invention, therefore, consists in the wind mill gearing constructed substantially as hereinafter specified and claimed.

In the accompanying drawings the figure is a perspective view of a wind mill gearing embodying my invention.

In the embodiment of my invention illustrated in the drawings, I employ a frame work 10, which, as shown, is carried by the usual turn table supported at the top of the wind mill tower. Said frame work comprises a pair of spaced semi-circular members and straight horizontal members connecting the semicircular members, said parts being secured to a tubular upright 11 that rises from the turn-table and through which passes the plunger or piston rod 12, which plunger or rod is pivotally connected to a lever 13 that is pivoted at one end to the top of the frame work 10 at one side thereof, and at its other end is pivotally connected to the upper end of a pitman 14 which is of split or bifurcated form and straddles a gear wheel 15 to which the pitman is pivotally connected eccentrically at opposite sides of said gear wheel, so that there is a direct and balanced connection between the gear wheel 15 and lever 13, which results in the subjection of the parts to strains only in direct lines, with no sidewise or oblique tendency, and hence, such parts as the pitman 14, the lever 13 and the pump rod or plunger 12, have no oblique strains thereon. The gear wheel 15 has no shaft, and, of course, can have none in view of the manner of the connection of the pitman 14 therewith, and to support it and retain it in its position I employ a number of pinions 16 (as shown four, although the number may be varied) that are suitably spaced apart around its periphery and which are journaled in bearings on the frame work 10. The pinions preferably have flanges on their opposite sides that overhang the sides of the gear wheel 15 to retain it from sidewise movement, and, of course, the same result can be secured by flanging the gear wheel and having it overlap the sides of the pinions. One of the pinions, and preferably an upper one, is the driving pinion, it being mounted on the wind wheel shaft 17. I prefer to use an upper pinion as the driving pinion because the weight and strain due to the lifting action of the pump piston is thrown downward by downward pressure upon the gear 15 and falls upon the several lowermost pinions. It will be perceived that all the pinions except the one mounted on the wind wheel shaft 17 are idlers and in effect rolling supports for the gear wheel 15, and the object in using pinions or small wheels with teeth is to secure a smooth easy running motion of the gear wheel 15.

Having thus described my invention what I claim is—

1. In a gearing for wind mills, the combination of a wind wheel shaft, a pitman, a part to be operated by the pitman, a wheel geared to said shaft with which the pitman is connected on opposite sides, and a series of rotatable elements engaging said wheel outside of the pivotal connection of the pitman therewith.

2. In a gearing for wind mills, the combination of a wind wheel shaft, a gear wheel, a series of pinions meshing with said gear wheel and constituting bearings therefor, a pitman straddling said gear wheel and pivotally connected therewith, and an element with which said pitman is connected.

3. In a gearing for wind mills, the combination of a wind wheel shaft, a gear wheel, a gear connection between said wheel and said shaft, a series of pinions meshing with said gear wheel and constituting bearings therefor, there being overlapping portions on said pinions and gear to restrain the gear from sidewise movement, a pitman straddling said gear wheel and pivotally connected therewith, and an element with which said pitman is connected.

In testimony that I claim the foregoing I have hereunto set my hand.

GEORGE W. ROBERTS.

Witnesses:
J. D. SCRUGGS,
T. A. SCRUGGS.